United States Patent [19]

Jackson

[11] 4,374,736
[45] Feb. 22, 1983

[54] DUAL-FLOW BAND SCREEN AND PROCESS FOR SUBSTITUTING IT FOR A THROUGH-FLOW BAND SCREEN

[75] Inventor: Philip Jackson, Paris, France

[73] Assignee: E. Beaudrey & Co. Societe Anonyme, Paris, France

[21] Appl. No.: 237,719

[22] Filed: Feb. 24, 1981

[30] Foreign Application Priority Data

Mar. 3, 1980 [FR] France ............................. 80 04678

[51] Int. Cl.³ .......................................... B01D 33/02
[52] U.S. Cl. .................................. 210/783; 210/160; 210/236
[58] Field of Search ............... 210/154, 155, 160, 161, 210/236, 241, 747, 780, 783

[56] References Cited

U.S. PATENT DOCUMENTS

| 1,208,655 | 12/1916 | Reynolds | 210/160 |
| 1,726,608 | 9/1929 | Brackett | 210/161 |
| 2,996,189 | 8/1961 | Salterbach | 210/236 X |
| 3,850,804 | 11/1974 | Taylor et al. | 210/155 |

FOREIGN PATENT DOCUMENTS

| 527255 | 9/1924 | France | 210/160 |
| 2110809 | 6/1972 | France | . |

Primary Examiner—John Adee
Attorney, Agent, or Firm—Charles A. Brown

[57] ABSTRACT

A dual-flow band screen includes a carrying frame and a screening band which is mounted so as to move in an endless loop on the frame. A support wall is associated with the carrying frame, which support wall overall extends perpendicularly to generatrices of its screening band, while possessing an opening opposite the latter, and which support wall laterally forms engagement lips by means of which it is capable of engaging with the guides in a sluice.

10 Claims, 9 Drawing Figures

DUAL-FLOW BAND SCREEN AND PROCESS FOR SUBSTITUTING IT FOR A THROUGH-FLOW BAND SCREEN

BACKGROUND OF THE INVENTION

The present invention relates generally to travelling band screens, that is to say screens comprising a carrying frame and a screening band which is mounted so as to move as an endless chain in the said frame.

Screens of this type are used, for example, to equip water intakes, in which case they are usually arranged vertically in a sluice feeding the water intake.

Depending on their position relative to the direction of the flow of water to be screened, they can be classified in one or other of two large categories.

Firstly, there are the through-flow band screens that is to say band screens in which only the upstream face of the screening band receives the water to be screened, the generatrices of this screening band being approximately perpendicular to the direction of flow of the water.

Usually, the carrying frame of a through-flow band screen of this type is simply slid, under leaktight conditions, by means of engagement lips provided for this purpose, into grooves or guides arranged face to face in the two opposite walls of the sluice to be equipped.

However, these through-flow band screens have various disadvantages, which are as follows.

It is firstly necessary to provide a sealing plate, referred to as a boot plate, at the base of the screening band in order to prevent leakage between the latter and the bottom, of the pit and the baseplate must be tangential to the screening band.

Now, taking into account the unavoidable manufacturing and assembling tolerances and the wear of the components, in particular the components of the screening band carrying chains, a minimum clearance always remains between this baseplate and the screening band and, in practice, this clearance is never less than about 6 mm; it even frequently exceeds this value.

Consequently screening bands of these through-flow screens are not equipped with mesh having apertures smaller than 6 mm, and consequently the efficiency of the screening is limited thereby.

Furthermore, in these through-flow band screens, impurities and other debris, arrested on the upstream face of the screening band, which escape the back washing usually provided at the top part of the screen are reintroduced into the water, via the downstream face of the screening band, and carried downstream of the screen.

The second category of band screens is that of the dual-flow band screen, in which, with the screening band having its generatrices parallel to the direction of the flow water to be screened flows through both faces of the screening band, whether the water flows from the outside towards the inside of the screening band, or whether it flows in the opposite direction.

The carrying frame of these dual-flow band screens is usually built against masonry walls set up opposite one another in the sluice to be equipped.

Since no leaktightness is to be provided at the base of the screening band, these dual-flow band screens have the advantage of permitting the use, for screening band of meshes of reduced size, for example of less than 0.5 mm, compatible with the minimal sealing cap.

They also have the advantage of allowing the simultaneous use of both faces of screening band, and hence of doubling, for the same volume, the effective screening surface, that is to say the capacity of the apparatus.

Now, in the case of the installations currently equipped with through-flow band screens, there is the increasing problem of improving the efficiency of the screening by reducing the dimensions of the debris or organisms capable of being retained.

For the reasons explained above, through-flow band screens of this type cannot easily satisfy this requirement.

However, hitherto, their substitution by dual-flow band screens has not been easy to carry out, the physical conditions of insertion of the latter being different.

In general terms, the object of the present invention is, on the contrary, to facilitate this substitution when desired.

SUMMARY OF THE INVENTION

According to the present invention there is provided a dual flow band screen for locating in a sluice, comprising:

(a) a carrying frame;

(b) a screening band mounted on the carrying frame and movable in an endless loop; and (c) a support wall mountable on guides in a sluice and associated with the carrying frame, which support wall extends perpendicularly to generatrices of the screening band, is formed with an aperture whose contour is wholly contained within the contour of the screening band, and has lips for engaging with the guides on the sluice.

Also according to the present invention there is provided a method of substituting a dual-flow band screen for a through-flow band screen engaged with guides in a sluice, including providing a carrying frame, a screening band mounted on the carrying frame and movable in an endless loop, and a support wall mountable on guides in the sluice which support wall is formed with an aperture whose contour is wholly containable within the contour of the screening band, has lips for engaging with the guides on the sluice; and is locatable perpendicular to generatrices of the screening band; withdrawing the through-flow band screen from the guides in the sluice; and engaging the support wall in the guides.

By virtue of this support wall, the dual-flow band screen according to the invention can easily and rapidly be substituted for a through-flow band screen, whether this support wall be firmly fixed to its frame or whether it constitutes a piece which is separate therefrom, sliding engagement means in that case being provided between the said support wall and the frame in order to position the screen after positioning the support wall.

In fact, the only civil engineering work which may be necessary is rectricted to enlarging and fitting out the aperture in the upper floor, located above the highest water level, of the sluice to be equipped, in order to permit the lowering, through this hole of the support wall and the screening band, the cross-section of this aperture not necessarily corresponding to the maximum cross-section of the band screen to be positioned according to the invention.

In all cases, the operations required for this positioning can advantageously be carried out even while the sluice to be equipped is still under water, that is to say without draining this sluice beforehand, a simple partition optionally being placed upstream of the sluice in order to stop the flow passing through the latter.

BRIEF DESCRIPTION OF THE DRAWINGS

An embodiment of the present invention will now be described by way of example and with reference to the accompanying drawings in which.

DESCRIPTION OF THE PREFERRED EMBODIMENT

The drawings illustrate a water intake sluice 10 having parallel masonry walls 11 which each comprises, opposite one another, a vertical guide 12 embedded in their bulk, on the surface of the wall, or sealed on the surface.

Figure 3:
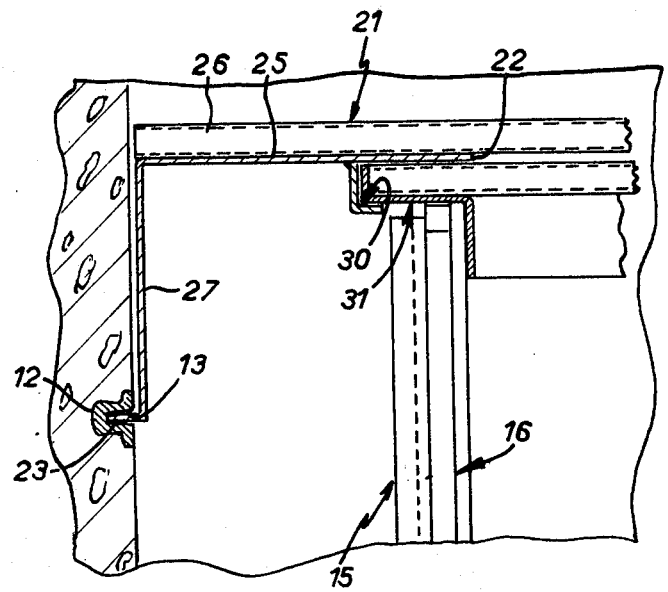
FIG. 3 shows, on a larger scale, the detail of FIG. 1 marked by an insert III in FIG. 1.

These guides 12 may be made of metal, and they each define a groove 13, as shown for one of the guides in FIG. 3.

A travelling band screen 15 used in the sluice 10 comprises a carrying frame 16 and a screening band 17 which is mounted so as to move in an endless loop on the frame.

The practical construction of a band screen of this type is in itself well known and, since it does not form part of the present invention, it will not be described in greater detail in this text.

The screening band 17, which extends substantially vertically, passes over a drive member 18 at its upper part and over a return member 19 at its lower part.

Figure 2:
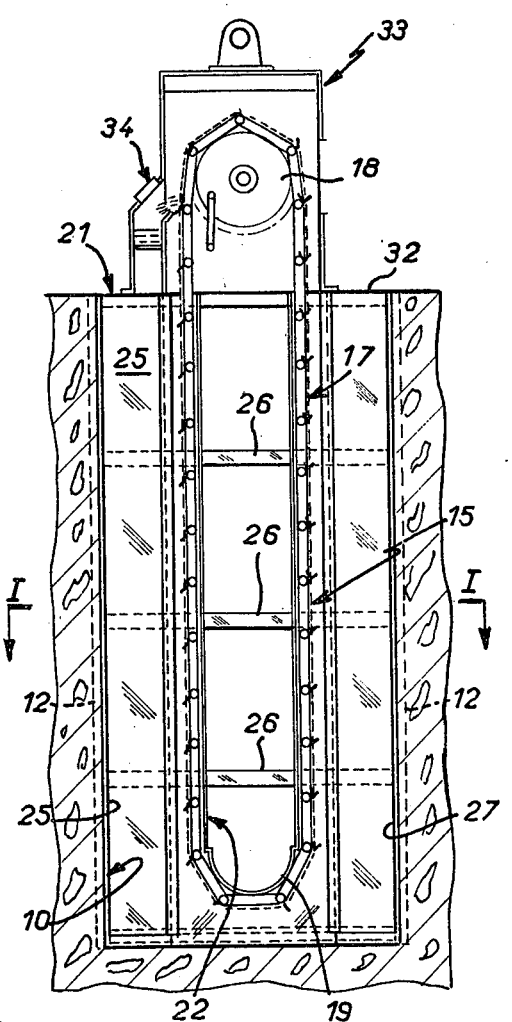
FIG. 2 is a view in elevation/section along the line II—II in FIG. 1.
Figure 4:
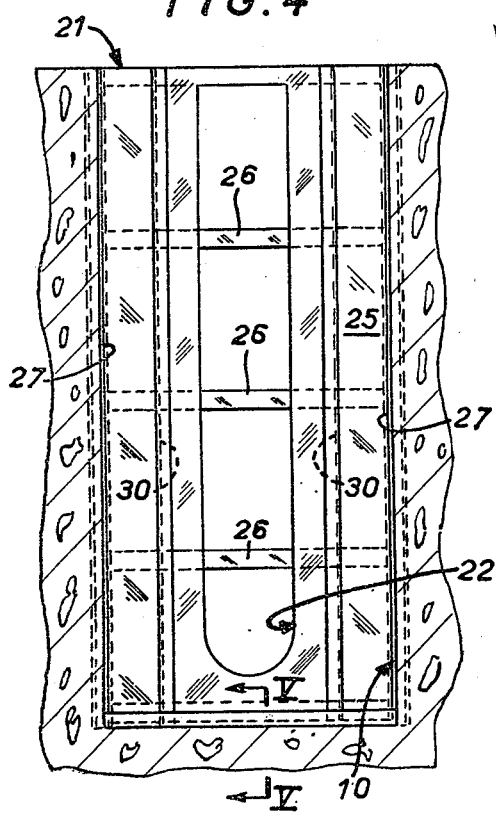
FIG. 4 is a view in elevation of only the support wall of the dual-flow band screen according to the invention, in the direction of the arrow IV in FIG. 1.

A support wall 21 is associated with the frame 16 of the band screen 15, which support wall extends generally perpendicular to the generatrices of the screening band 17 and hence perpendicularly to the axes of the drive member 18 and return member 19, whilst having an opening 22 whose contour is wholly contained in the contour of the screening band 17, as shown in FIG. 2, and has at its sides engagement lips 23 which engage with the guides 12 in the sluice 10.

In the embodiment shown, the support wall 21 consists of a simple metal plate 25 which is suitably reinforced, on its face opposite the screen 15, by a system of crosspieces 26, and its engagement lips 23 are formed by bent-back parts, pointing in opposite directions, at the end of right-angle flanges 27 of the plate 25.

At its base, the support wall 21 carries a seal.

Figure 5:
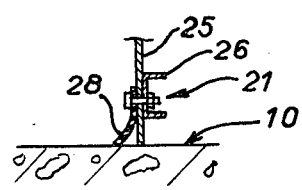
FIG. 5 is a partial view thereof in cross-section, on a different scale, along the line V—V in FIG. 4.

As shown in FIG. 5, this seal may be a simple sheet 28 of elastic material, joined to the base of the plate 25 which this support wall 21 comprises.

Figure 1:
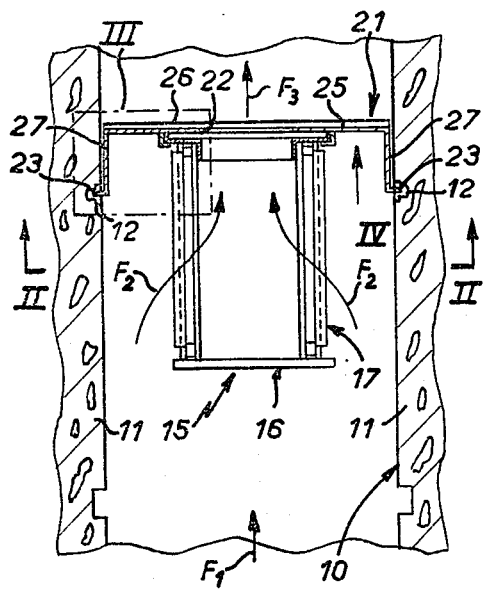
FIG. 1 is a view in elevation/section, along line I—I in FIG. 2, of a water intake sluice equipped with a dual-flow band screen according to the invention.

Overall, the support wall 21 extends transversely relative to the sluice 10, so that the generatrices of the screening band 17 of the screen 15 are parallel to the direction of the flow of water to be filtered in this sluice 10, as marked by the arrow F1 in FIG. 1.

As a result, the insertion of the screen 15 into this sluice 10 makes it a dual-flow band screen, the water to be screened passing in parallel through both faces or sides of the screening band 17, in the direction of the arrows F2 in FIG. 1, before re-emerging axially, in the direction of the arrow F3 through the opening 22 in the support wall 21.

In the embodiment shown, the screen 15 is arranged upstream of its support wall 21, so that the water to be screened passed through the screening band 17 from the outside towards the inside.

However, the screen 15 could be arranged downstream of the support wall 21, the water to be screened in that case passing through the screening band 17 from the inside towards the outside.

Whichever arrangement is adopted, the support wall 21 can in both cases be firmly fixed to the carrying frame 16 of the screen 15.

However, in the embodiment shown, the support wall 21 is separate from the carrying frame 16, sliding engagement means being provided between the support wall 21 and the carrying frame 16.

For example, and as shown more clearly in FIG. 3 the plate 25 which the support wall 21 comprises has two vertical slides 30 parallel to one another, on either side of its opening 22, and the carrying frame 16 of the screen 15 has laterally, in opposite directions, two flanges 31 by means of which the frame engages with the slides 30.

In this case, the carrying frame 16 of the screen 15 can rest on the bottom of the sluice 10 in the same way as the support wall 21, or it can be suspended from the upper floor 32 of the sluice or from a superstructure overhanging the sluice.

As illustrated schematically in FIG. 2, a superstructure 33 of this type is provided and, in particular, it is used to support a back washing station 34 to which the screening band 17 is subjected.

Whatever the arrangement, the support wall 21 extends upwards as far as a level which is at least as high as the highest water level, but it does not have to extend beyond the highest water level.

In the case in which the carrying frame 16 of the screen 15 engages, by means of flanges 31, with slides 30 on the support wall 21, as shown, the unavoidable assembly clearance between these flanges 31 and these slides 30 naturally becomes clogged in service. This clearance is small, and the clogging provides all the leaktightness which may be desired.

Figure 6A:
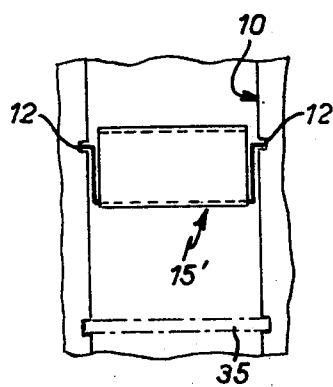
FIGS. 6A, 6B, 6C and 6D are schematic views in elevation illustrating some of the successive stages of the operations required for the substitution, according to the invention, of a dual-flow for a through-flow band screen.

The dual-flow band screen described above can advantageously be substituted for a pre-existing direct-passage band screen 15′, as shown schematically in FIG. 6A.

In this case, the substitution may be carried out even while the sluice 10 is still under water, that is to say without draining the sluice.

Figure 6B:
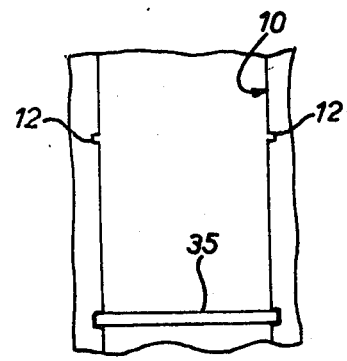
Figure 6C:
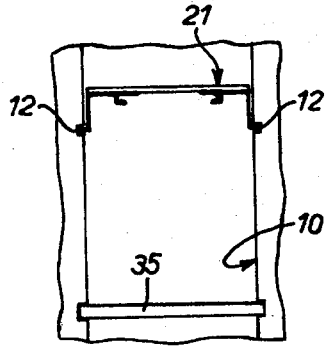

However, in order to break the flow, a simple transverse partition 35 can be arranged upstream of the screen 15′ to be removed, as shown schematically in broken lines in FIG. 6A and in solid lines in FIGS. 6B and 6C.

The through-flow screen 15′ is then withdrawn from the guides 12 in the sluice 10, as shown in FIG. 6B, and, after possible modification of the opening in the upper floor of the sluice 10, the support wall 21 is engaged in the guides 12 in the sluice, as shown in FIG. 6C.

Figure 6D:
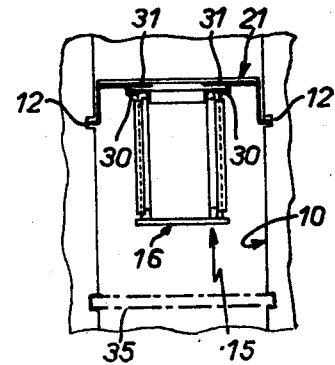

It then suffices to position the dual-flow band screen 15 by engaging and sliding the flanges 31 on its carrying frame 16 into the slides 30 on the support wall 21, as shown in FIG. 6D.

The partition 35 can subsequently be withdrawn, as shown in broken lines in this FIG. 6D.

What I claim is:

1. A dual-flow band screen for a sluice, said dual-flow band screen comprising a carrying frame, a screening band mounted for movement in an endless loop on said carrying frame, and a support wall mountable in guides provided in the sluice and cooperable with said carrying frame and positioning said carrying frame in the sluice, said support wall extending perpendicularly to generatrices of said screening band and generally parallel to said carrying frame, an aperture in said support wall being wholly contained within the contour defined by said screening band, said support wall having lips for engagement in the guides.

2. A dual-flow band screen according to claim 1, wherein said support wall comprises a plate having right-angled flange portions, said lips being bent-back portions extending in opposite directions from ends of said flange portions.

3. A dual-flow band screen according to claim 1 or 2, comprising a seal at the base of said support wall.

4. A dual-flow band screen according to claim 1 or 2, wherein said support wall is fixedly secured to said frame.

5. A dual-flow band screen according to claim 1 or 2, wherein sliding engagement means are provided between said support wall and said frame.

6. The dual-flow band screen of claim 1, said lips being respectively received in a pair of opposed walls of the sluice.

7. A method of replacing a dual-flow band screen for a through-flow band screen engaged in guides in a sluice, in which said dual-flow band screen comprises a carrying frame, a screening band mounted on said carrying frame for movement in an endless loop, the method comprising the stages of: providing a support wall being mountable in guides in the sluice and cooperable with the carrying frame and positioning the carrying frame in the sluice, the support wall extending perpendicularly to the generatrices of the screen band and generally parallel of the carrying frame, and an aperture in the support wall being wholly contained within the contour defined by screening band, the support wall having lips for engagement with the guides in the sluice; removing said through-flow screen from the guides in the sluice; and inserting the support wall into said guides.

8. A method according to claim 7, wherein said carrying frame is fixed to the support wall prior to inserting the support wall into the guides whereby said carrying frame is brought into position in the sluice simultaneously with the support wall.

9. A method according to claim 7, wherein the carrying frame is slidably engageable with the support wall, the carrying frame being brought into position in the sluice after inserting the support wall into the guides.

10. A method according to claim 7, the removal and insertion steps being carried out without draining the sluice, comprising providing a temporary wall upstream of the sluice to break the flow of water into the sluice.

* * * * *